(12) United States Patent
Zheng

(10) Patent No.: US 12,172,113 B2
(45) Date of Patent: Dec. 24, 2024

(54) AIR FILTER

(71) Applicant: Hongda Zheng, Zhejiang (CN)

(72) Inventor: Hongda Zheng, Zhejiang (CN)

(73) Assignee: Zhejiang Nan Pu Pneumatic Component Co., Ltd., Zhejiang (CN)

( * ) Notice: Subject to any disclaimer, the term of this patent is extended or adjusted under 35 U.S.C. 154(b) by 0 days.

(21) Appl. No.: 18/788,132

(22) Filed: Jul. 30, 2024

(65) Prior Publication Data

US 2024/0382883 A1   Nov. 21, 2024

(51) Int. Cl.
*B01D 45/16* (2006.01)
*B01D 46/00* (2022.01)
*B01D 46/58* (2022.01)

(52) U.S. Cl.
CPC ......... *B01D 45/16* (2013.01); *B01D 46/0005* (2013.01); *B01D 46/58* (2022.01)

(58) Field of Classification Search
CPC ..... B01D 45/16; B01D 46/0005; B01D 46/58
See application file for complete search history.

(56) References Cited

U.S. PATENT DOCUMENTS

| | | | | |
|---|---|---|---|---|
| 3,707,068 A * | 12/1972 | Bloom | ............ | B01D 45/16 55/396 |
| 3,834,417 A * | 9/1974 | Holben | ............ | F16L 41/03 285/12 |
| 4,516,994 A * | 5/1985 | Kocher | ............ | F25B 43/02 55/498 |
| 4,668,256 A * | 5/1987 | Billiet | ............ | B01D 45/16 55/398 |
| 4,692,175 A * | 9/1987 | Frantz | ............ | B01D 46/0031 55/486 |
| 4,812,149 A * | 3/1989 | Griffin | ............ | B01D 46/2407 95/290 |
| 4,964,898 A * | 10/1990 | Toda | ............ | B01D 45/02 55/424 |
| 5,961,678 A * | 10/1999 | Pruette | ............ | B01D 46/2414 55/528 |
| 7,931,740 B2 * | 4/2011 | Al-Alusi | ............ | B01D 45/16 95/271 |
| 10,101,067 B2 * | 10/2018 | Lundberg | ............ | F25B 43/02 |
| 11,215,205 B2 * | 1/2022 | Pastori | ............ | B01D 29/13 |
| 2003/0159412 A1 * | 8/2003 | North | ............ | A47L 9/1658 55/428 |

(Continued)

*Primary Examiner* — Dung H Bui

(57) ABSTRACT

An air filter includes a mounting head, a centrifugal separation assembly and a plurality of filtration assemblies. The mounting head is provided with a centrifugal mounting portion and a plurality of filtration mounting portions. The centrifugal separation assembly is removably connected with the centrifugal mounting portion. The centrifugal separation assembly is used for separating a solid and liquid in an airflow. The plurality of filtration assemblies include "7"-shaped import pipe fittings, filtration shells and filtration apparatuses, the filtration shells are provided with filtration cavities and openings connected with the filtration cavities, the filtration shells are connected with the filtration mounting portions, the filtration apparatuses are disposed in the filtration cavities, inner walls of the import pipe fittings are defined to form import channels, first ends of the import pipe fittings are connected with the filtration mounting portions.

15 Claims, 10 Drawing Sheets

(56) References Cited

U.S. PATENT DOCUMENTS

| | | | | |
|---|---|---|---|---|
| 2006/0162299 A1* | 7/2006 | North | .................. | B04C 5/26 |
| | | | | 55/345 |
| 2008/0149574 A1* | 6/2008 | Read | .................. | B01D 46/0031 |
| | | | | 210/806 |
| 2014/0083064 A1* | 3/2014 | Sakai | .................. | B04C 5/06 |
| | | | | 55/449 |
| 2015/0273484 A1* | 10/2015 | Ho | .................. | B01D 45/08 |
| | | | | 55/321 |
| 2018/0117511 A1* | 5/2018 | Yamauchi | .................. | B01D 45/12 |

* cited by examiner

AIR FILTER

TECHNICAL FIELD

The present disclosure relates to the technical field of air filtration apparatuses, and in particular to an air filter.

BACKGROUND OF THE INVENTION

As an apparatus for separating water, oil, dust and other impurities in air, the oil-water separator of an air pump is widely applied in automobile, pharmacy and other industries, and especially in a painting operation process of the automobile, the air pump needs to extract air from its surroundings and compress the air, the paint is sprayed to the surface of a workpiece by using high-pressure gas, but due to the existence of water, floating oil drops, dust and other impurities in the air of the surroundings, the air filter such as the oil-water separator must be used to filter the air.

Currently, the existing air filter such as the oil-water separator on the market exists a certain issues, and in the existing air filter such as the oil-water separator, one side of a mounting head that faces a filtration assembly is provided with an air inlet and an air outlet, the air inlet is provided in a middle and disposed in a form of surrounding a connecting screw while the air outlet is disposed on one side of the air inlet, this structure causes the opening position and opening size of a product to be affected by a base size, and the relatively small air outlet and air inlet lead to the obstruction of airflow circulation, which not only affects the pressure of the finally exported airflow, but also affects the filtration effect, with a poor product use experience.

Hence, the present disclosure provides an air filter, which can effectively solve the foregoing issue, and has a simple structure, a reasonable design, an unobstructed airflow channel, and a good filtration effect.

SUMMARY OF THE INVENTION

In order to overcome the shortcomings of the prior art, the present disclosure provides an air filter. The air filter has a simple structure, a reasonable design, an unobstructed airflow channel, and a good filtration effect.

The technical solution adopted by the present disclosure to solve the technical problem is as follows.

An air filter, includes:
a mounting head, wherein the mounting head is provided with a centrifugal mounting portion and a plurality of filtration mounting portions, the centrifugal mounting portion is provided with a centrifugal air inlet and a centrifugal air outlet, the filtration mounting portions are provided with filtration air inlets and filtration air outlets, and the filtration air outlets communicate with the adjacent filtration air inlets;
a centrifugal separation assembly, wherein the centrifugal separation assembly is removably connected with the centrifugal mounting portion, and the centrifugal separation assembly is used for separating a solid and liquid in an airflow; and
a plurality of filtration assemblies, wherein the plurality of filtration assemblies include "7"-shaped import pipe fittings, filtration shells and filtration apparatuses, the filtration shells are provided with filtration cavities and openings connected with the filtration cavities, the filtration shells are connected with the filtration mounting portions, the filtration apparatuses are disposed in the filtration cavities, inner walls of the import pipe fittings are defined to form import channels, first ends of the import pipe fittings are connected with the filtration mounting portions, first ends of the import channels communicate with the filtration air inlets, second ends of the import pipe fittings are inserted along the openings and connected with the filtration apparatuses, air guide channels are formed between outer surfaces of the import pipe fittings and inner walls of the openings, and the filtration cavities communicate with the filtration air outlets through the air guide channels.

As an improvement of the present disclosure, the filtration apparatuses are columnar and provided with intermediate channels, and the intermediate channels communicate with second ends of the import channels, allowing the airflow to enter the intermediate channels, pass through the filtration apparatuses and enter the filtration cavities.

As an improvement of the present disclosure, the filtration apparatuses include filter elements, support nets and end connectors, the filter elements are connected with the support nets, the support nets are connected with the end connectors, and the end connectors are connected with the second ends of the import pipe fittings.

As an improvement of the present disclosure, the plurality of filtration assemblies are successively disposed in parallel, and along a direction away from the centrifugal separation assembly, the filter elements of the filtration assemblies have gradually increased degrees of filtration.

As an improvement of the present disclosure, the centrifugal separation assembly includes a separation shell and a spiral spoiler, the separation shell is provided with a separation cavity, the separation shell and the spiral spoiler are connected with the centrifugal mounting portion, the spiral spoiler is plugged into the separation cavity, a gap formed between the spiral spoiler and an inner wall of the separation cavity communicates with the centrifugal air inlet, a spiral portion is disposed on a surface of the spiral spoiler, an outer surface of the spiral portion abuts against the inner wall of the separation cavity, a reflux channel is disposed in a middle of the spiral spoiler, and the separation cavity communicates with the centrifugal air outlet through the reflux channel.

As an improvement of the present disclosure, the centrifugal separation assembly further includes a condensation reflux member, the condensation reflux member is removably connected with the spiral spoiler and inserted into the reflux channel, and the condensation reflux member is used for condensing liquid drops and allows the liquid drops to flow down along the condensation reflux member.

As an improvement of the present disclosure, the air filter further includes a liquid outlet stopper, a bottom of the separation shell is provided with a liquid outlet that communicates with the separation cavity, and the liquid outlet stopper is removably plugged into the liquid outlet.

As an improvement of the present disclosure, the air filter further includes a pressure-regulating assembly, the mounting head is provided with a pressure-regulating mounting portion, the pressure-regulating assembly is removably connected with the pressure-regulating mounting portion, and the pressure-regulating mounting portion communicates with the centrifugal air outlet and is used to regulate the air pressure of the airflow flowing out of the centrifugal air outlet.

As an improvement of the present disclosure, the centrifugal mounting portion is provided with a first chamber, and also provided with a pressure-regulating air hole that communicates with the first chamber and the centrifugal air outlet, the pressure-regulating assembly includes a connecting shell and a valve assembly, the connecting shell is provided with a connecting chamber and an air vent communicating with the connecting chamber, the valve assembly is disposed between the first chamber and the connecting chamber, and when the air pressure of the first chamber is greater than the pressure required to open the valve assembly, the valve assembly is opened, allowing the airflow to flow through the connecting chamber from the first chamber and to be discharged along the air vent.

As an improvement of the present disclosure, the valve assembly includes a first elastic member, a diaphragm and a valve rod, the first elastic member is disposed in the connecting chamber, the diaphragm is provided with an air valve hole, the valve rod is disposed in the centrifugal mounting portion, and an elastic force of the first elastic member drives the diaphragm to be downward, such that an upper end of the valve rod is plugged into the air valve hole and abuts against an edge of the air valve hole.

As an improvement of the present disclosure, the pressure-regulating assembly further includes a spiral regulating shell, a screw member and a nut base, the spiral regulating shell is rotationally connected with the connecting shell, the screw member is connected with the connecting shell, the nut base is in threaded connection with the screw member, the nut base is connected with an upper end of the first elastic member, and a lower end of the first elastic member abuts against an upper surface of the diaphragm.

As an improvement of the present disclosure, the valve assembly further includes a second elastic member and a valve base, the valve base is connected with a bottom of the valve rod, and one end of the second elastic member abuts against the valve base while the other end abuts against an interior of the mounting head.

As an improvement of the present disclosure, a valve rod channel and a valve rod air hole passing through a side wall of the valve rod channel are disposed in the valve rod, the valve rod channel communicates with the separation cavity, and the valve rod channel communicates with the centrifugal air outlet through the valve rod air hole.

As an improvement of the present disclosure, the air filter further includes a first barometer, the first barometer is connected with the centrifugal mounting portion of the mounting head, the mounting head is provided with a first barometer channel, and the first barometer channel communicates with an air inlet of the first barometer and the centrifugal air outlet.

As an improvement of the present disclosure, the air filter further includes a second barometer, the second barometer is connected with one filtration mounting portion of the mounting head, the mounting head is provided with a second barometer channel, and the second barometer channel communicates with an air inlet of the second barometer and the import channels.

As an improvement of the present disclosure, the condensation reflux member includes a tubular condenser pipe and a connecting base, the condenser pipe is provided with a connecting channel, a screw portion of the connecting base passes through the connecting channel and is connected with the spiral spoiler, and an upper end of the condenser pipe abuts against the spiral spoiler while a lower end abuts against an abutment of the connecting base.

As an improvement of the present disclosure, an edge at a bottom of the connecting base is provided with an inclined diversion bevel, a gap exists between the edge of the connecting base and the separation shell, and the gap allows the liquid to flow through.

As an improvement of the present disclosure, the air filter further includes an air inlet cover, the air inlet cover is removably connected with the mounting head and caps the centrifugal air inlet.

As an improvement of the present disclosure, a surface of the spiral regulating shell is also provided with frictional stripes.

As an improvement of the present disclosure, the mounting head is also provided with an airflow guide identification, and the airflow guide identification is used for identifying a flowing direction of the airflow.

Beneficial effects: Through the arrangement of the above-mentioned structure, when in use, the airflow generated by the air pump enters the centrifugal separation assembly along the centrifugal air inlet, the airflow after partial water, oil drops, dust and impurities therein are separated enters the filtration assemblies along the centrifugal air outlet and the filtration air inlets, the first ends of the "7"-shaped import pipe fittings are connected with the filtration mounting portions, the airflow enters the filtration assemblies along the import channels, flows out to the filtration air outlets along the air guide channels between the outer surfaces of the import pipe fittings and the inner walls of the openings after being filtered by the filtration apparatuses, and finally is discharged along the air outlets after layered filtration by the plurality of filtration assemblies; and the air guide channels formed between the outer surfaces of the import pipe fittings and the inner walls of the openings are annular and have a greater hole diameter, and moreover no screws pass through the air inlets and are connected with the filtration mounting portions, such that greater sizes of air inlets and air outlets of the filtration assemblies can be set, with an unobstructed airflow channel and a good filtration effect.

BRIEF DESCRIPTION OF DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE INVENTION

Figure 1:
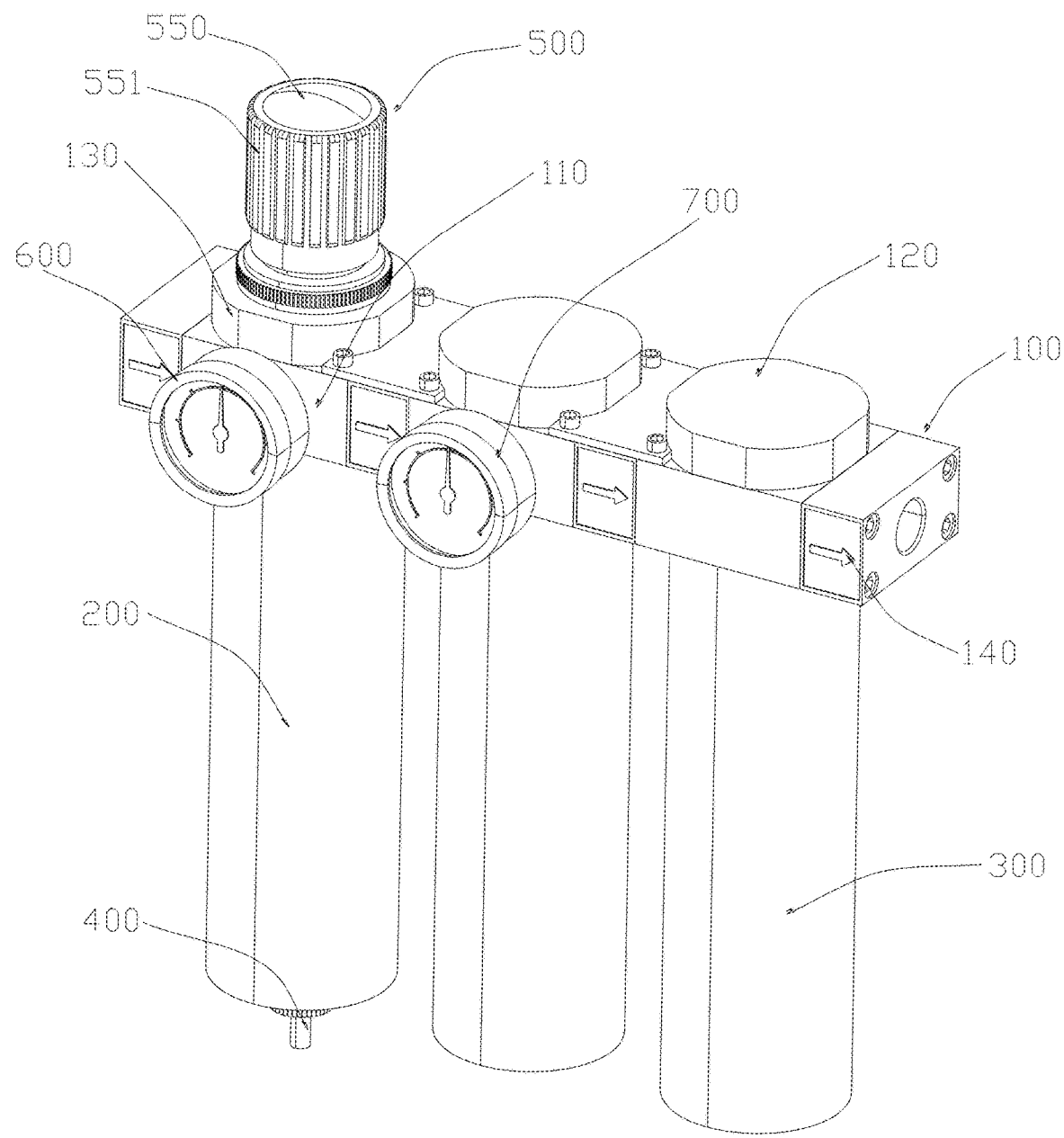
FIG. 1 is a diagram of an overall structure of the present disclosure.
Figure 2:
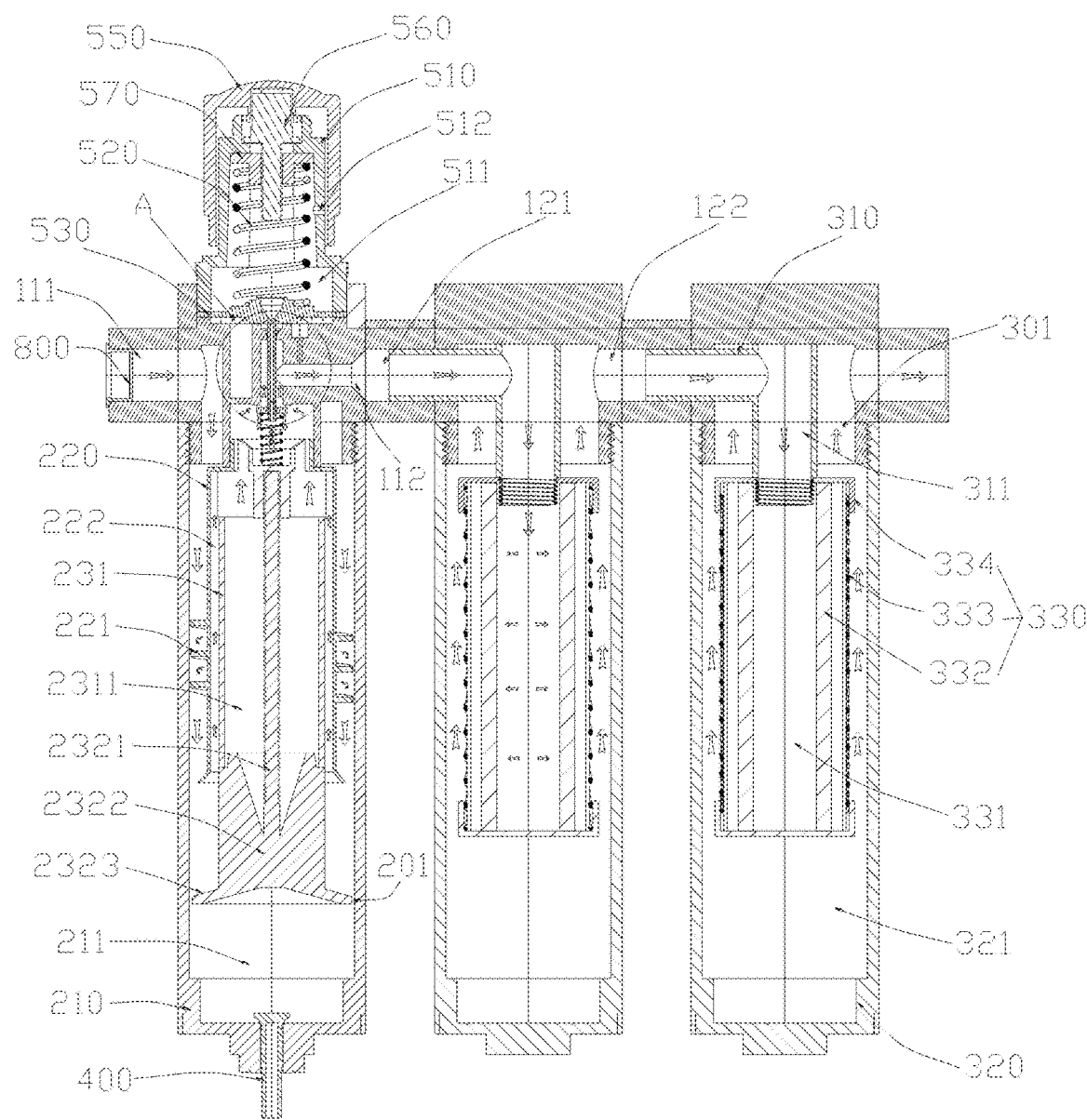
FIG. 2 is a sectional view when air pressure matches with pressure of a first elastic member in the present disclosure.
Figure 3:
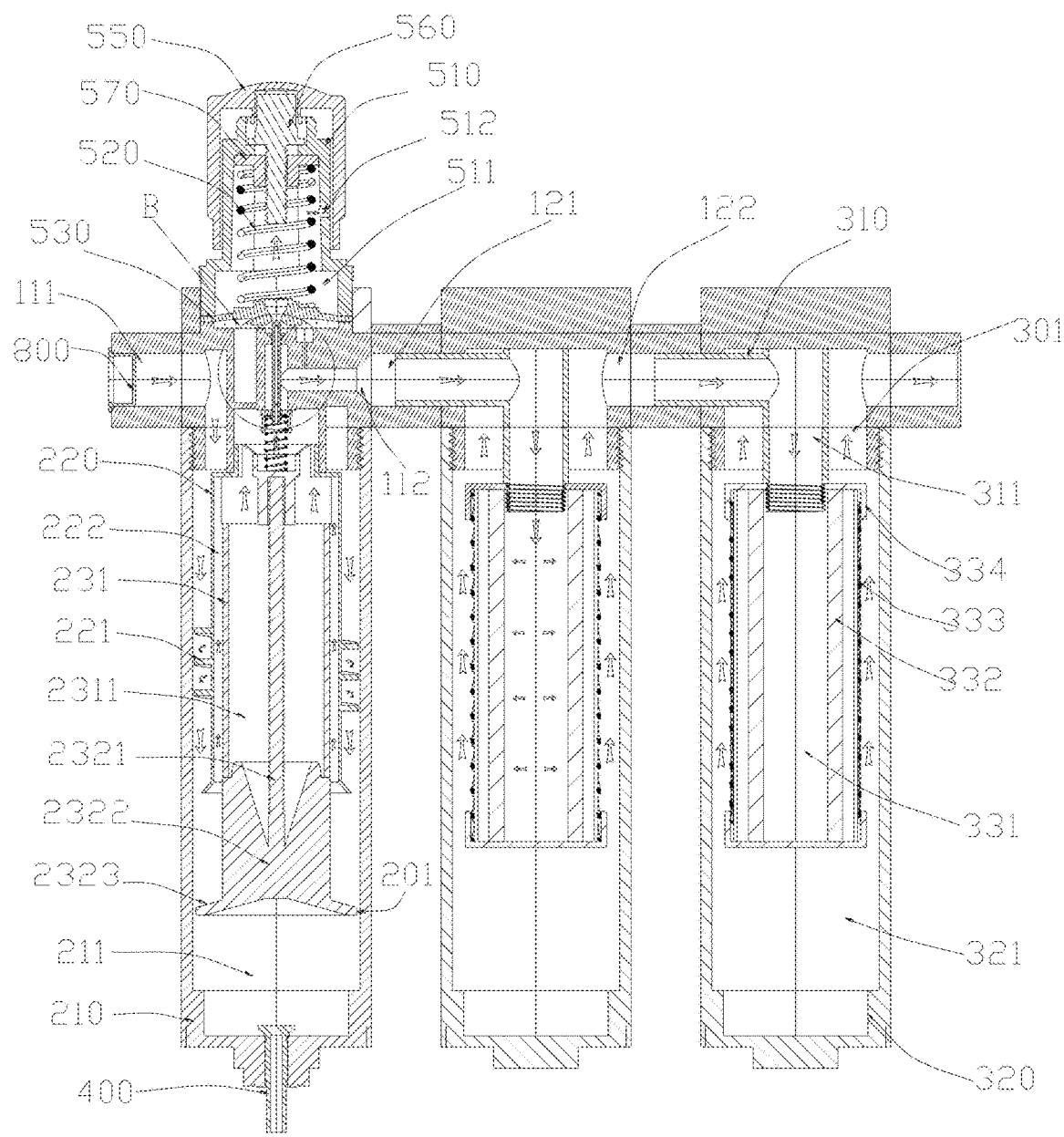
FIG. 3 is a sectional view when air pressure is greater than pressure of a first elastic member in the present disclosure.

With reference to FIGS. 1-10, an air filter, including:

a mounting head 100, where the mounting head 100 is provided with a centrifugal mounting portion 110 and a plurality of filtration mounting portions 120, the centrifugal mounting portion 110 is provided with a centrifugal air inlet 111 and a centrifugal air outlet 112, the filtration mounting portions 120 are provided with filtration air inlets 121 and filtration air outlets 122, and the filtration air outlets 122 communicate with the adjacent filtration air inlets 121;

a centrifugal separation assembly 200, where the centrifugal separation assembly 200 is removably connected with the centrifugal mounting portion 110, and the centrifugal separation assembly 200 is used for separating a solid and liquid in an airflow; and a plurality of filtration assemblies 300, where the plurality of filtration assemblies 300 includes "7"-shaped import pipe fittings 310, filtration shells 320 and filtration apparatuses 330, the filtration shells 320 are provided with filtration cavities 321 and openings 322 connected with the filtration cavities 321, the filtration shells 320 are connected with the filtration mounting portions 120, the filtration apparatuses 330 are disposed in the filtration cavities 321, inner walls of the import pipe fittings 310 are defined to form import channels 311, first ends of the import pipe fittings 310 are connected with the filtration mounting portions 120, first ends of the import channels 311 communicate with the filtration air inlets 121, second ends of the import pipe fittings 310 are inserted along the openings 322 and connected with the filtration apparatuses 330, air guide channels 301 are formed between outer surfaces of the import pipe fittings 310 and inner walls of the openings 322, and the filtration cavities 321 communicate with the filtration air outlets 122 through the air guide channels 301.

Through the arrangement of the above-mentioned structure, when in use, the airflow generated by the air pump enters the centrifugal separation assembly 200 along the centrifugal air inlet 111, the airflow after partial water, oil drops, dust and impurities therein are separated enters the filtration assemblies 300 along the centrifugal air outlet 112 and the filtration air inlets 121, the first ends of the "7"-shaped import pipe fittings 310 are connected with the filtration mounting portions 120, the airflow enters the filtration assemblies 300 along the import channels 311, flows out to the filtration air outlets 122 along the air guide channels 301 between the outer surfaces of the import pipe fittings 310 and the inner walls of the openings 322 after being filtered by the filtration apparatuses 330, and finally is discharged along the air outlets after layered filtration by the plurality of filtration assemblies 300; and the air guide channels 301 formed between the outer surfaces of the import pipe fittings 310 and the inner walls of the openings 322 are annular and have a greater hole diameter, and moreover no screws pass through the air inlets and are connected with the filtration mounting portions 120, such that greater sizes of air inlets and air outlets of the filtration assemblies 300 can be set, with an unobstructed airflow channel and a good filtration effect.

In this embodiment, the filtration apparatuses 330 are columnar and provided with intermediate channels 331, and the intermediate channels 331 communicate with second ends of the import channels 311, allowing the airflow to enter the intermediate channels 331, pass through the filtration apparatuses 330 and enter the filtration cavities 321. Through the arrangement of the above-mentioned structure, when in use, the airflow passes through the filtration air inlets 121 and import channels 311 and flows into the intermediate channels 331, which fully increases a contact area between the airflow and the filtration apparatuses 330, making various portions of the filtration assembly be filtered simultaneously, with an increased airflow velocity and a good filtration effect.

In this embodiment, the filtration apparatuses 330 include filter elements 332, support nets 333 and end connectors 334, the filter elements 332 are connected with the support nets 333, the support nets 333 are connected with the end connectors 334, and the end connectors 334 are connected with the second ends of the import pipe fittings 310. Through the arrangement of the above-mentioned structure, when in mounting, the end connectors 334 are connected with the second ends of the import pipe fittings 310, which can fix the filtration apparatuses 330, while the filter elements 332 are disposed between the two end connectors 334, and two ends of the support nets 333 are connected with the two end connectors 334, the filter elements 332 are fixed, and the product has a stable connecting structure.

In this embodiment, the plurality of filtration assemblies 300 are successively disposed in parallel, and along a direction away from the centrifugal separation assembly 200, the filter elements 332 of the filtration assemblies 300 have gradually increased degrees of filtration. Through the arrangement of the above-mentioned structure, when in use, the airflow flows out along the centrifugal air outlet 112 and flows into one filtration assembly 300, the filter element 332 of this filtration assembly 300 has a relatively low degree of filtration, so impurities with relatively great particle sizes can be filtered; after flowing out along this filtration assembly 300, the airflow flows into the next filtration assembly 300, the filter element 332 of this filtration assembly 300 has a relatively high degree of filtration, so impurities with relatively small particle sizes can be filtered; after layered filtration, the water, oil drops, dust and other impurities in the air are fully filtered, the airflow flowing out finally is cleaner, the product has a better filtration effect; and moreover the layered filtration can make full use of the filter elements of different degrees of filtration, and when the good filtration effect is achieved, the filter elements have long service life.

In this embodiment, the centrifugal separation assembly 200 includes a separation shell 210 and a spiral spoiler 220, the separation shell 210 is provided with a separation cavity 211, the separation shell 210 and the spiral spoiler 220 are connected with the centrifugal mounting portion 110, the spiral spoiler 220 is plugged into the separation cavity 211, a gap formed between the spiral spoiler 220 and an inner wall of the separation cavity 211 communicates with the centrifugal air inlet 111, a spiral portion 221 is disposed on a surface of the spiral spoiler 220, an outer surface of the spiral portion 221 abuts against the inner wall of the separation cavity 211, a reflux channel 222 is disposed in a middle of the spiral spoiler 220, and the separation cavity 211 communicates with the centrifugal air outlet 112 through the reflux channel 222. Through the arrangement of the above-mentioned structure, when in use, the airflow enters the separation cavity 211 along the centrifugal air inlet 111 and flows down along the gap between the spiral spoiler 220 and the inner wall of the separation cavity 211, the airflow rotates when flowing through the spiral portion 221, the water, oil drops, dust and other impurities are thrown to the inner wall of the separation cavity 211 by using the centrifugal force, such that the water, oil drops, dust and other impurities fall to the bottom of the separation cavity 211 along the inner wall of the separation cavity 211, while the clean airflow flows out along the reflux channel 222 and the centrifugal air outlet 112.

In this embodiment, the centrifugal separation assembly 200 further includes a condensation reflux member 230, the condensation reflux member 230 is removably connected with the spiral spoiler 220 and inserted into the reflux channel 222, and the condensation reflux member 230 is used for condensing liquid drops and allows the liquid drops to flow down along the condensation reflux member 230. Through the arrangement of the above-mentioned structure, when in use, partial water and oil drops will be in contact with the surface of the condensation reflux member 230, form relatively big liquid drops on the surface of the condensation reflux member 230 and finally flows down to the bottom of the separation cavity 211 along the surface of the condensation reflux member 230 under the action of gravity when the airflow flows down along the gap between the spiral spoiler 220 and the inner wall of the separation cavity 211, thus achieving gas-liquid separation and further improving filtration and gas-liquid separation effects of the product.

In this embodiment, the air filter further includes a liquid outlet stopper 400, a bottom of the separation shell 210 is provided with a liquid outlet 212 that communicates with the separation cavity 211, and the liquid outlet stopper 400 is removably plugged into the liquid outlet 212. Through the arrangement of the above-mentioned structure, when the product is used, the liquid outlet stopper 400 is plugged and blocks the liquid outlet 212, such that the separation cavity 211 remains sealed and the airflow flows out stably along the reflux channel 222 and the centrifugal air outlet 112; and when the product is cleaned, the liquid outlet stopper 400 is pulled out, making water, oil and other liquid flow out along the liquid outlet 212 for ease of cleaning, and at the same time the separation shell 210 can be removed, facilitating the further cleaning of the product.

In this embodiment, the air filter further includes a pressure-regulating assembly 500, the mounting head 100 is provided with a pressure-regulating mounting portion 130, the pressure-regulating assembly 500 is removably connected with the pressure-regulating mounting portion 130, and the pressure-regulating mounting portion 130 communicates with the centrifugal air outlet 112 and is used to regulate the air pressure of the airflow flowing out of the centrifugal air outlet 112. Through the arrangement of the above-mentioned structure, when in use, users can use the pressure-regulating assembly 500 to regulate the air pressure of the airflow flowing out of the centrifugal air outlet 112, to meet different use demands of the users.

In this embodiment, the centrifugal mounting portion 110 is provided with a first chamber 101, and also provided with a pressure-regulating air hole 102 that communicates with the first chamber 101 and the centrifugal air outlet 112, the pressure-regulating assembly 500 includes a connecting shell 510 and a valve assembly, the connecting shell 510 is provided with a connecting chamber 511 and an air vent 512 communicating with the connecting chamber 511, the valve assembly is disposed between the first chamber 101 and the connecting chamber 511, and when the air pressure of the first chamber 101 is greater than the pressure required to open the valve assembly, the valve assembly is opened, allowing the airflow to flow through the connecting chamber 511 from the first chamber 101 and to be discharged along the air vent 512. Through the arrangement of the above-mentioned structure, the first chamber 101 communicates with the centrifugal air outlet 112 through the pressure-regulating air hole 102, then the air pressure in the first chamber 101 is close that at the centrifugal air outlet 112; when the air pressure in the first chamber 101 is greater than the pressure required to open the valve assembly, the air valve is opened, partial airflow passes through the valve assembly and is discharged along the connecting chamber 511 and the air vent 512, allowing the air pressure in the first chamber 101 and the air pressure at the centrifugal air outlet 112 to be reduced; and when the air pressure in the first chamber 101 is less than or equal to the pressure required to open the valve assembly, the air valve is closed, the airflow flows out along the centrifugal air outlet 112, the users can manually regulate the pressure required to open the valve assembly, thus regulating the air pressure at the centrifugal air outlet 112.

In this embodiment, the valve assembly includes a first elastic member 520, a diaphragm 530 and a valve rod 540, the first elastic member 520 is disposed in the connecting chamber 511, the diaphragm 530 is provided with an air valve hole 531, the valve rod 540 is disposed in the centrifugal mounting portion 110, and an elastic force of the first elastic member 520 drives the diaphragm 530 to be downward, such that an upper end of the valve rod 540 is plugged into the air valve hole 531 and abuts against an edge of the air valve hole 531. Through the arrangement of the above-mentioned structure, when the air pressure in the first chamber 101 is greater than the elastic force of the first elastic member 520, the air pressure drives a middle of the diaphragm to bulge upward, at this time the air valve hole 531 is separated from the upper end of the valve rod 540, the air valve hole 531 is opened, the gas is discharged along the air valve hole 531, connecting chamber 511 and air vent 512, to reduce the air pressure of the airflow flowing out of the centrifugal air outlet 112, allowing the air pressure to match with the elastic force of the first elastic member 520 finally; and when the air pressure in the first chamber 101 is reduced to be less than or equal to the elastic force of the first elastic member 520, the elastic force of the first elastic member 520 enables the diaphragm 530 to have a tendency of moving downward, and the air valve hole 531 is blocked by the upper end of the valve rod 540.

In this embodiment, the pressure-regulating assembly 500 further includes a spiral regulating shell 550, a screw member 560 and a nut base 570, the spiral regulating shell 550 is rotationally connected with the connecting shell 510, the screw member 560 is connected with the connecting shell 510, the nut base 570 is in threaded connection with the screw member 560, the nut base 570 is connected with an upper end of the first elastic member 520, and a lower end of the first elastic member 520 abuts against an upper surface of the diaphragm 530. Through the arrangement of the above-mentioned structure, when in use, the users can screw the spiral regulating shell 550, the spiral regulating shell 550 drives the screw member 560 to rotate, the nut base 570 moves upward or downward in relative to the screw member 560, thus compressing or releasing the first elastic member 520, to regulate the elastic force of the first elastic member 520, and then to regulate the air pressure of the airflow flowing out of the centrifugal air outlet 112.

Figure 4:
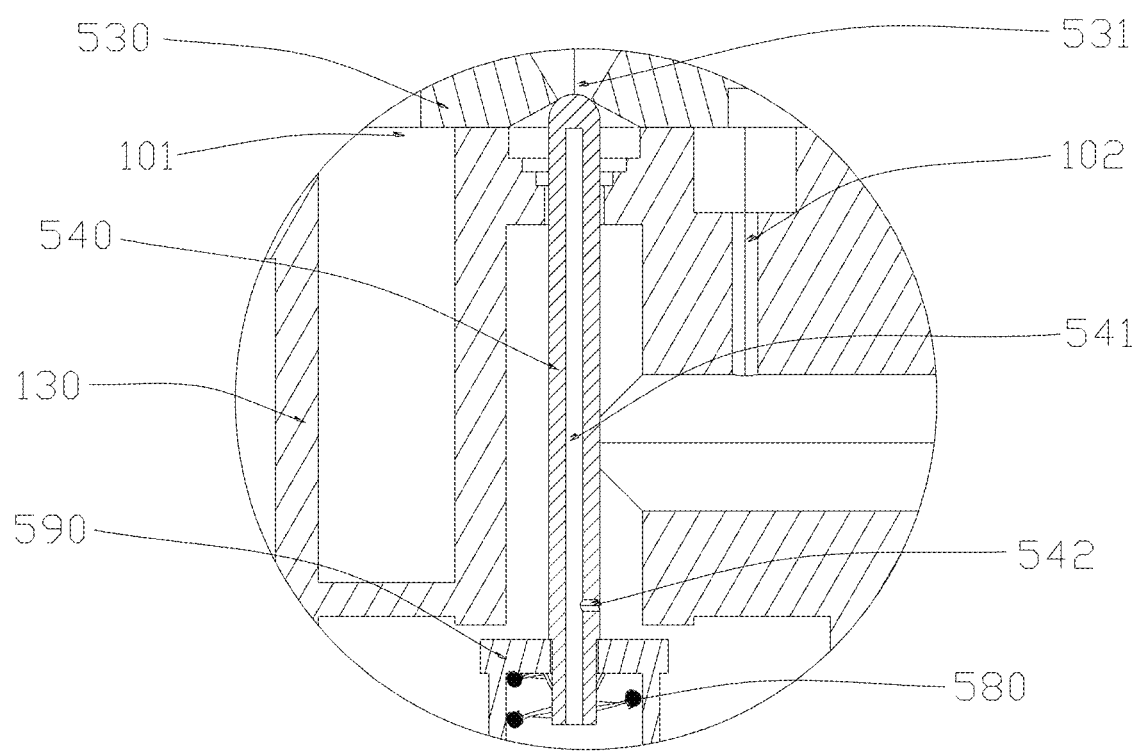
FIG. 4 is an enlarged view of a part A in FIG. 2.
Figure 5:
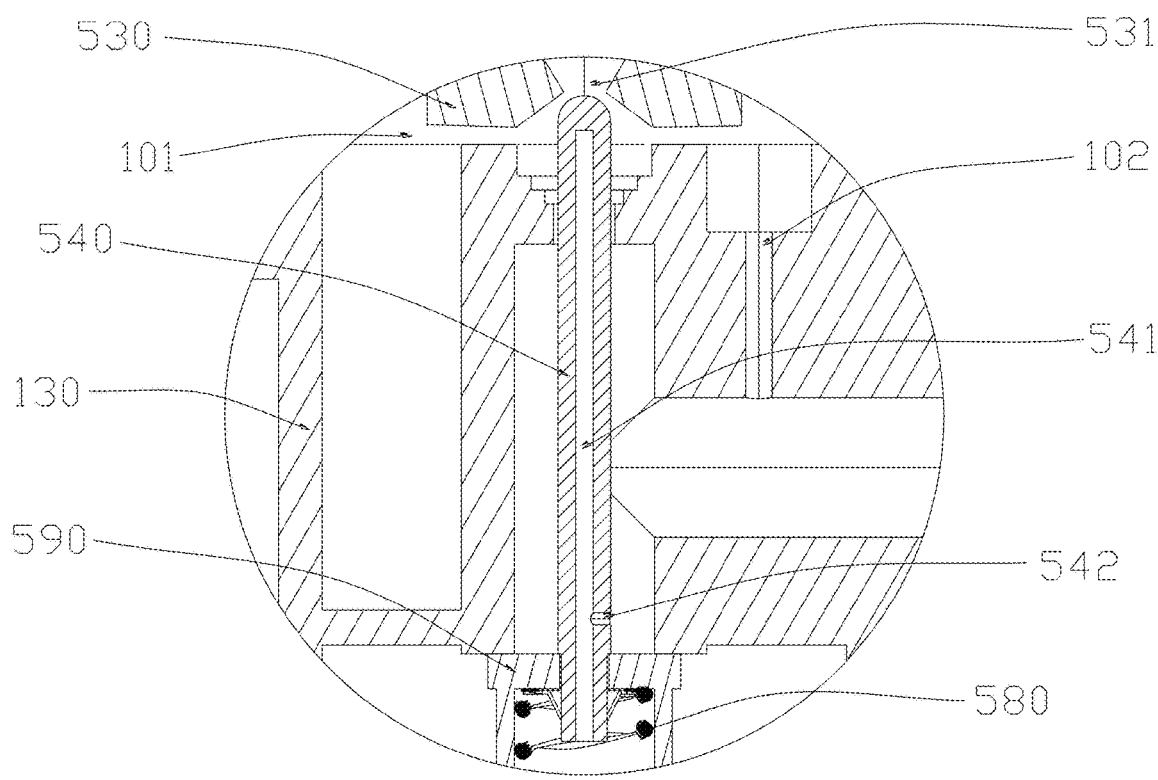
FIG. 5 is an enlarged view of a part B in FIG. 3.
Figure 6:
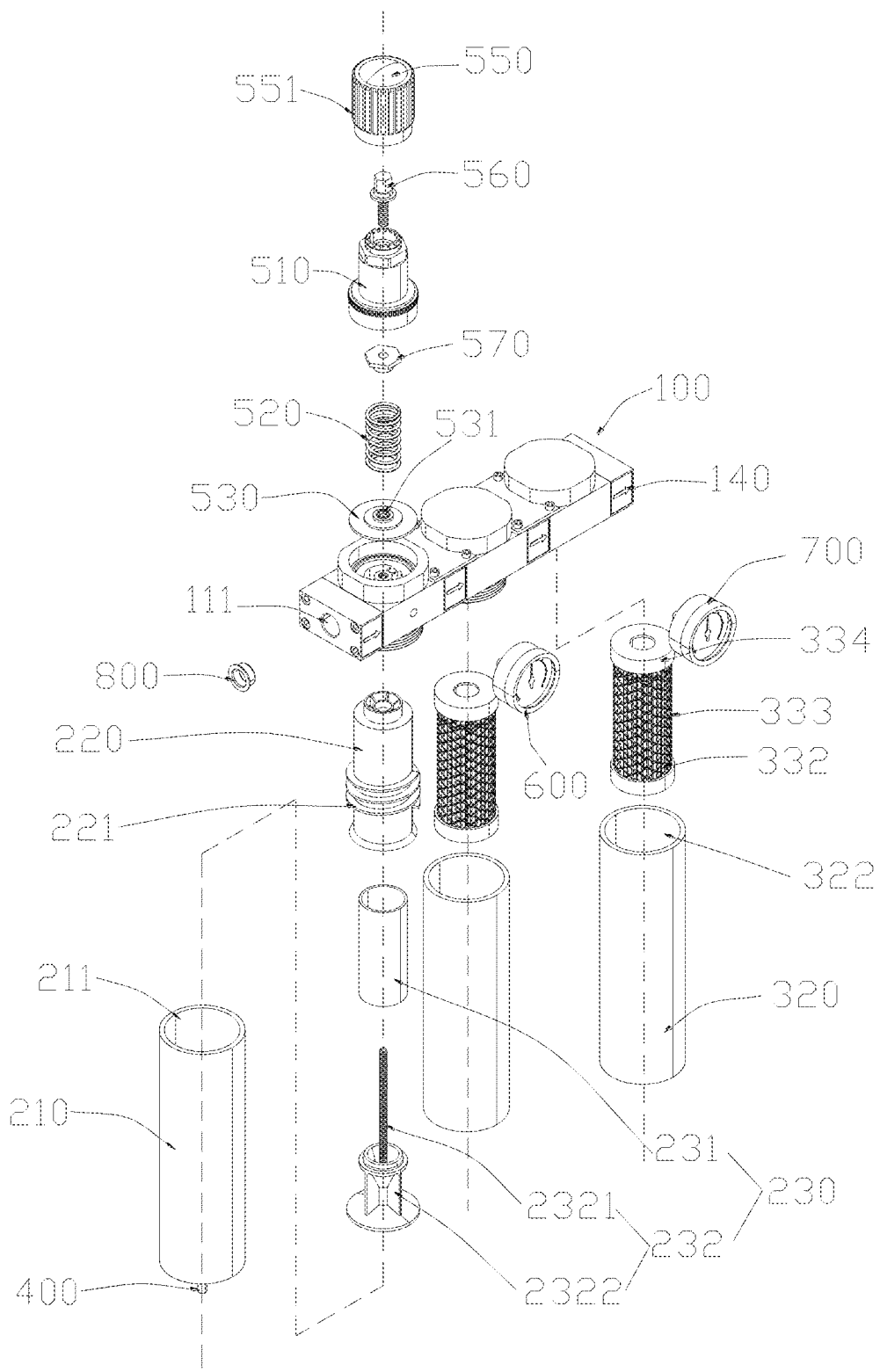
FIG. 6 is a schematic diagram of an exploded state of the present disclosure.
Figure 7:
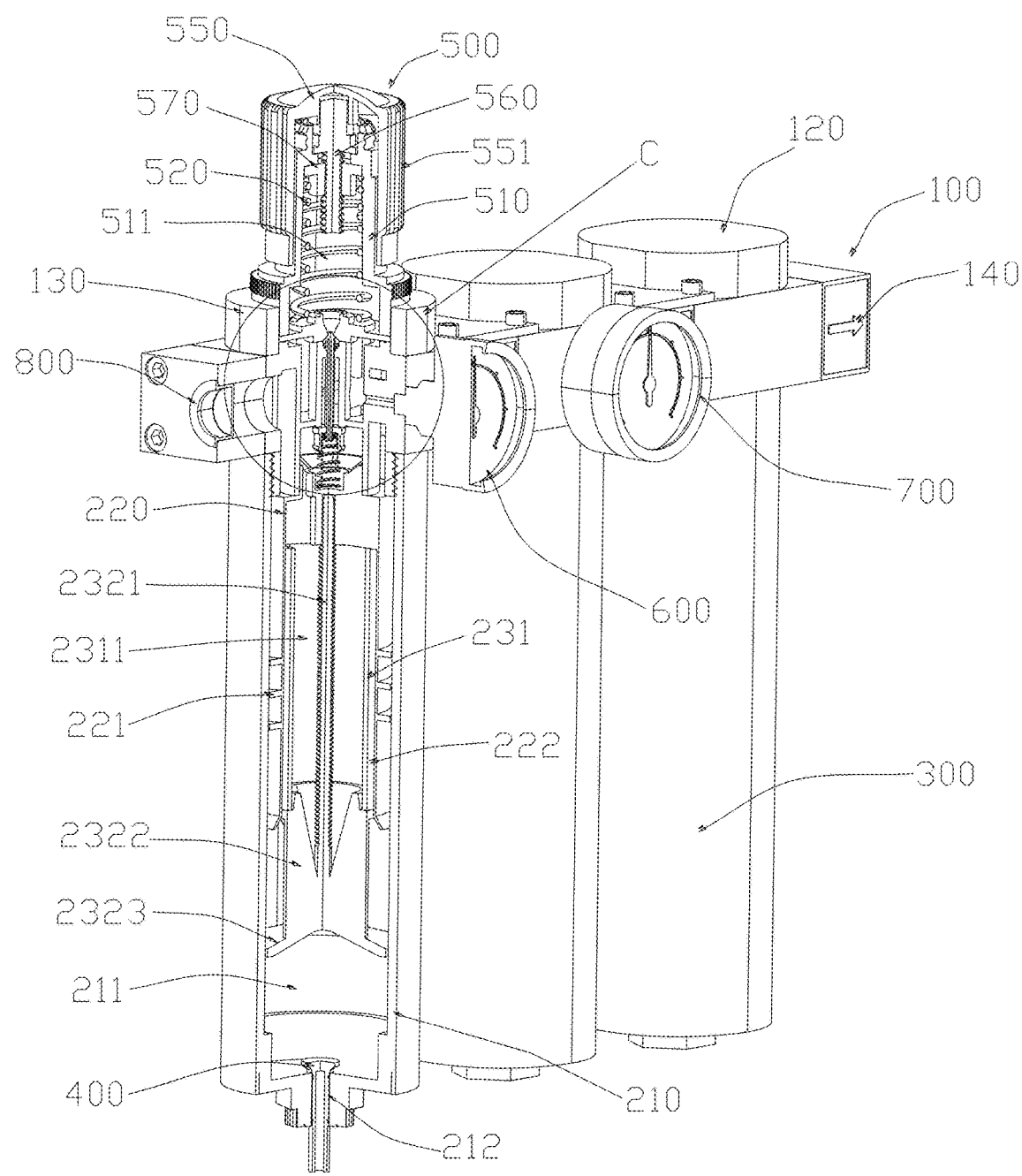
FIG. 7 is a schematic diagram of a local section state of the present disclosure.
Figure 8:
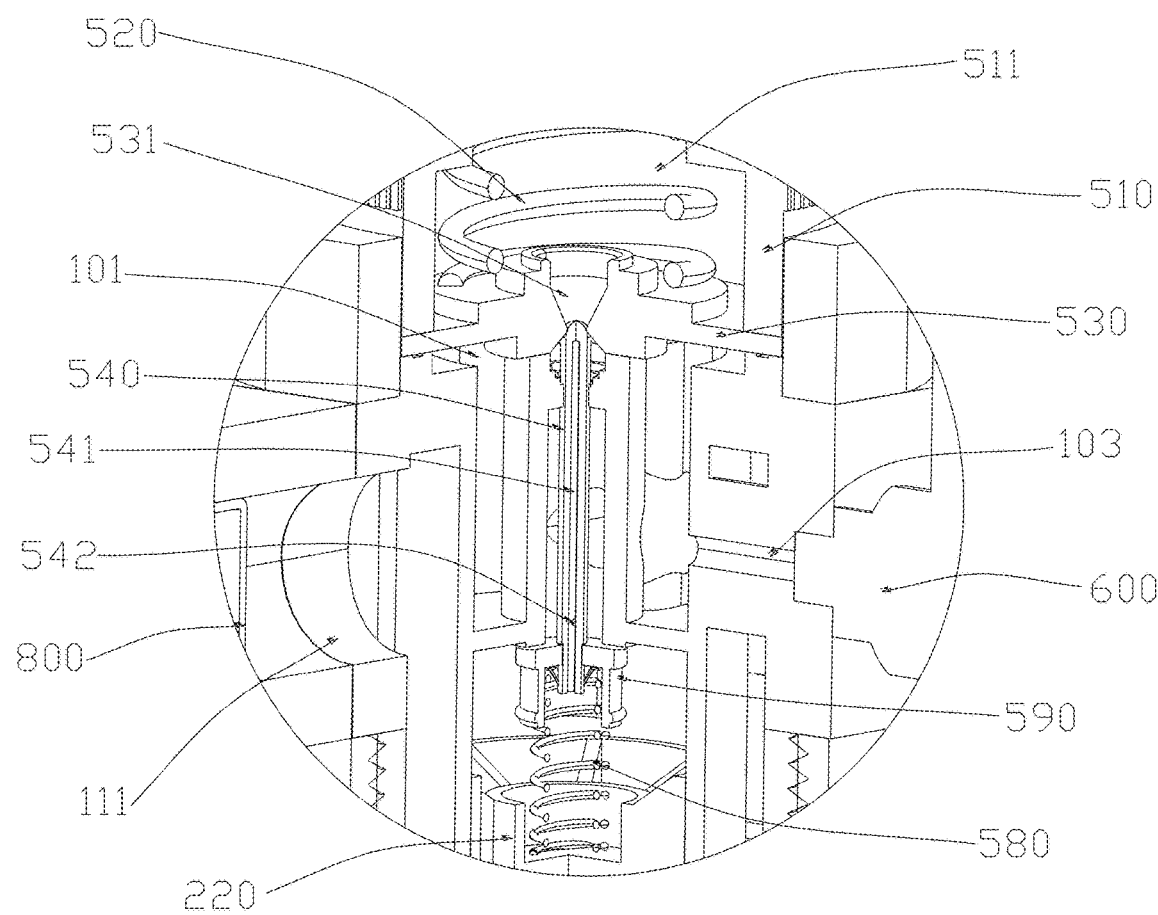
FIG. 8 is an enlarged view of a part C in FIG. 7.
Figure 9:
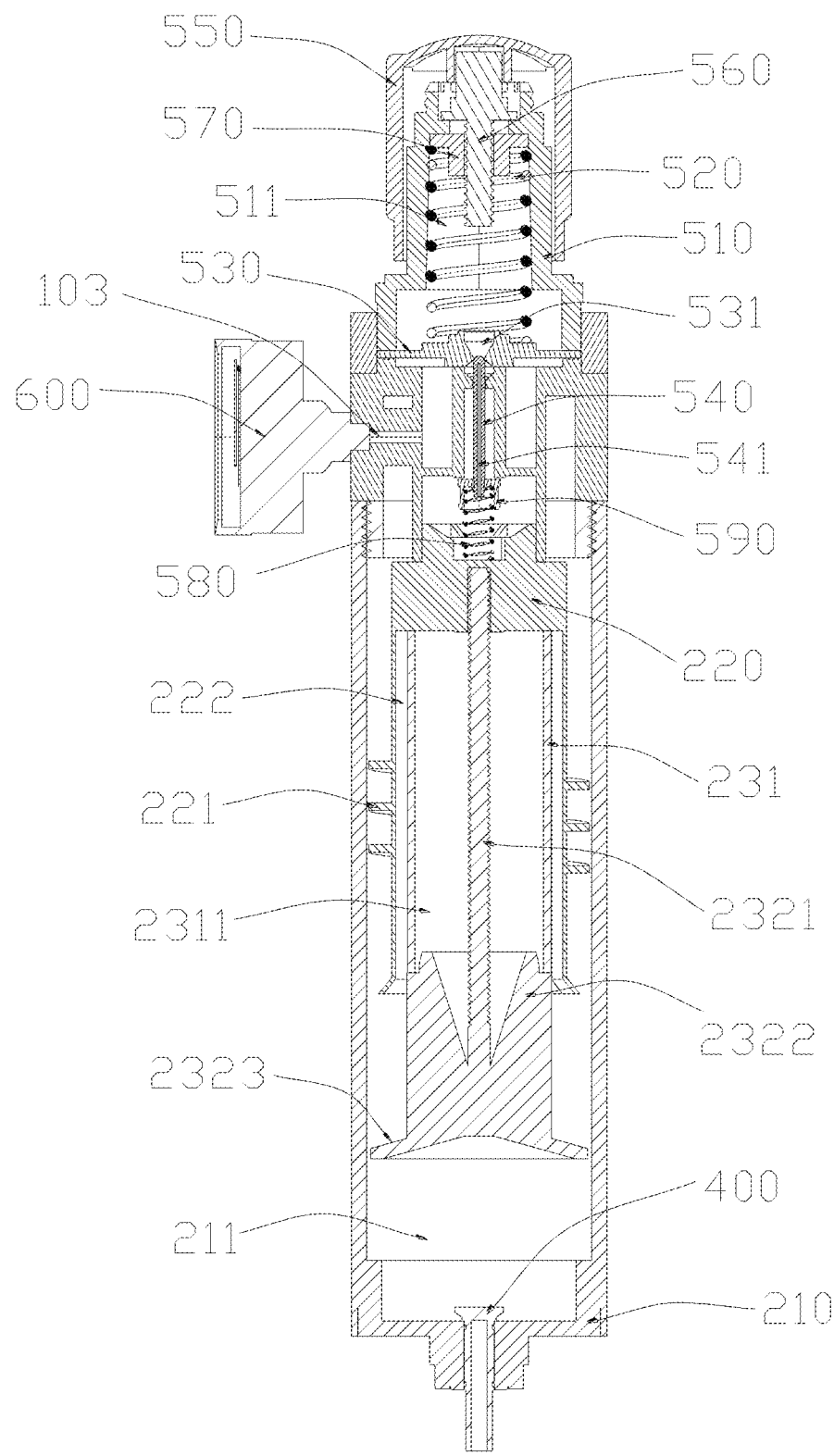
FIG. 9 is a sectional view along a vertical axis of a centrifugal mounting portion in the present disclosure.
Figure 10:
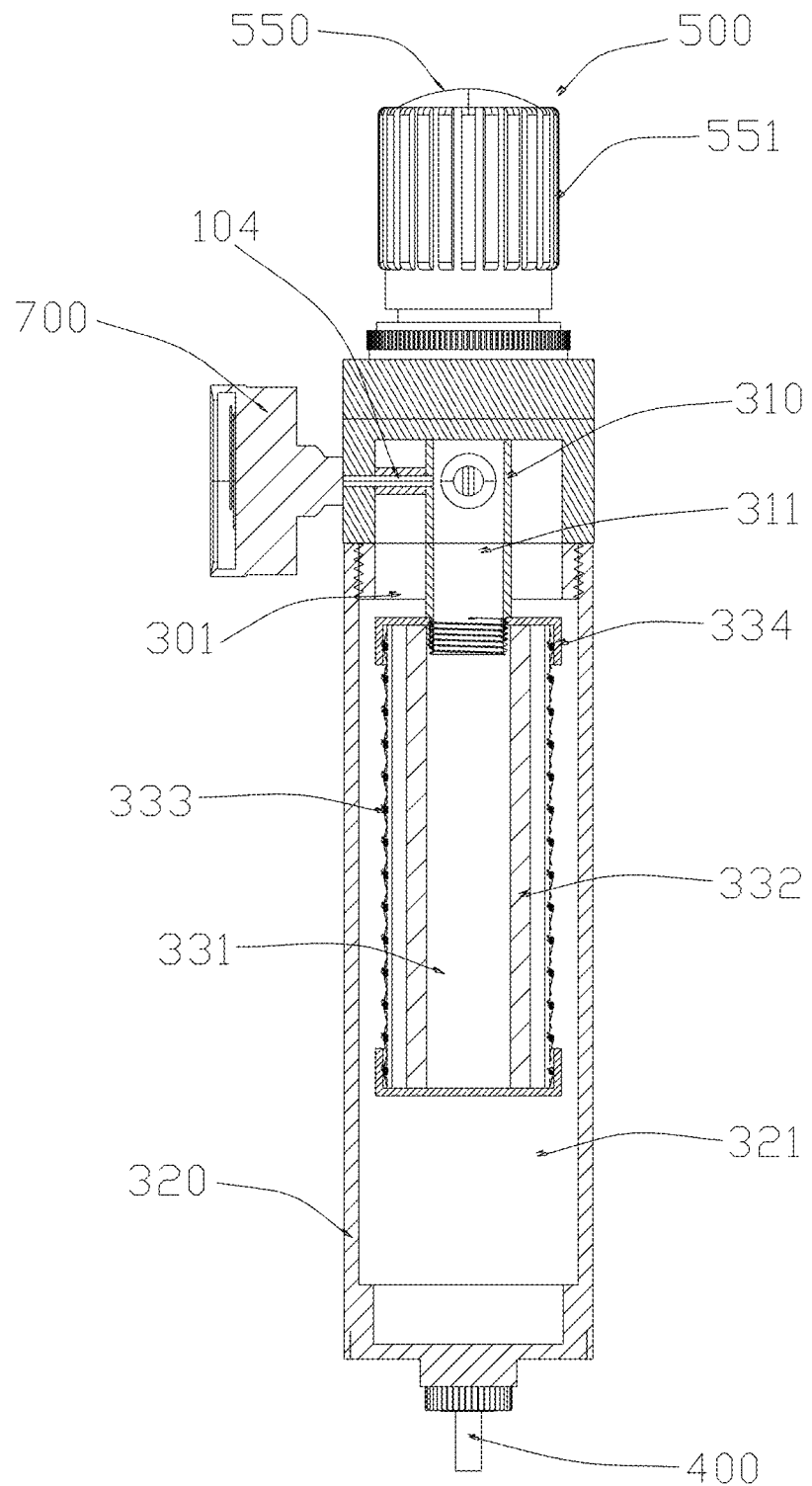
FIG. 10 is a sectional view along a vertical axis of a filtration mounting portion in the present disclosure.

In this embodiment, the valve assembly further includes a second elastic member 580 and a valve base 590, the valve base 590 is connected with a bottom of the valve rod 540, and one end of the second elastic member 580 abuts against the valve base 590 while the other end abuts against an interior of the mounting head 100. Through the arrangement of the above-mentioned structure, when the air pressure in the first chamber 101 is less than or equal to the elastic force of the first elastic member 520, the elastic force of the first elastic member 520 enables the diaphragm 530 to have a tendency of moving downward, and the air valve hole 531 is blocked by the upper end of the valve rod 540 and drives the valve rod 540 to move down; and the second elastic member 580 is compressed to deform, at this time a gap exists between the valve base 590 and the cavity inner wall of the mounting head 100, and this gap allows the airflow to pass through, to increase the flow of the airflow, thus making the air pressure at the centrifugal air outlet 112 increase, as shown in FIG. 4. When the air pressure in the first chamber 101 is greater than the elastic force of the first elastic member 520, the air pressure drives the diaphragm to bulge upward, at this time the air valve hole 531 is separated from the upper end of the valve rod 540, the valve base 590 moves up under the action of the elastic reset force of the second elastic member 580 and abuts against the cavity inner wall of the mounting head 100, the air valve hole 531 is opened, the gas is discharged along the air valve hole 531, connecting chamber 511 and air vent 512, and at the same time the gap between the valve base 590 and the cavity inner wall of the mounting head 100 is closed, as shown in FIG. 5, to reduce the flow of the airflow, thus reducing the air pressure of the airflow flowing out of the centrifugal air outlet 112; and finally under the action of the elastic force of the first elastic member 520, the second elastic member 580 and the air pressure, the gap between the valve base 590 and the cavity inner wall of the mounting head 100 reaches a suitable width, making the elastic force of the first elastic member 520, the second elastic member 580 and the air pressure be balance, and then making the air pressure be stable.

In this embodiment, a valve rod channel 541 and a valve rod air hole 542 passing through a side wall of the valve rod channel 541 are disposed in the valve rod 540, the valve rod channel 541 communicates with the separation cavity 211, and the valve rod channel 541 communicates with the centrifugal air outlet 112 through the valve rod air hole 542. Through the arrangement of the above-mentioned structure, when in use, whether the gap between the valve base 590 and the cavity inner wall of the mounting head 100 is opened or closed, the airflow can flow into the centrifugal air outlet 112 along the valve rod channel 541 and valve rod air hole 542, to guarantee the conduction of the airflow channel.

In this embodiment, the air filter further includes a first barometer 600, the first barometer 600 is connected with the centrifugal mounting portion 110 of the mounting head 100, the mounting head 100 is provided with a first barometer channel 103, and the first barometer channel 103 communicates with an air inlet of the first barometer 600. Through the arrangement of the above-mentioned structure, when in use, the air inlet of the first barometer 600 communicates with the centrifugal air outlet 112 through the first barometer channel 103, such that the first barometer 600 can measure the air pressure at the centrifugal air outlet 112 and display data, the users can intuitively observe the air pressure data when manually regulating the spiral regulating shell 550, and select the suitable using air pressure accordingly, to meet the using demands of the users.

In this embodiment, the air filter further includes a second barometer 700, the second barometer 700 is connected with one mounting portion 120 of the mounting head 100, the mounting head 100 is provided with a second barometer channel 104, and the second barometer channel 104 communicates with an air inlet of the second barometer 700 and the import channels 311. Through the arrangement of the above-mentioned structure, when in use, the airflow enters the air inlet of the second barometer 700 from the import channels 311 along the second barometer channel 104, such that the second barometer 700 can measure and display the air pressure in the import channels 311, achieving human-computer interaction and facilitating the users to understand the working state of the product.

In this embodiment, the condensation reflux member 230 includes a tubular condenser pipe 231 and a connecting base 232, the condenser pipe 231 is provided with a connecting channel 2311, a screw portion 2321 of the connecting base 232 passes through the connecting channel 2311 and is connected with the spiral spoiler 220, and an upper end of the condenser pipe 231 abuts against the spiral spoiler 220 while a lower end abuts against an abutment 2322 of the connecting base 232. Through the arrangement of the above-mentioned structure, when in mounting, the condenser pipe 231 is sleeved on the connecting base 232, the screw portion 2321 of the connecting base 232 passes through the connecting channel 2311 and is connected with the spiral spoiler 220, the connecting base 232 is screwed until an upper end of the condenser pipe 231 abuts against the spiral spoiler 220 while a lower end abuts against an abutment 2322 of the connecting base 232, and the product has a simple structure and stable connection.

In this embodiment, an edge at a bottom of the connecting base 232 is provided with an inclined diversion bevel 2323, a gap 201 exists between the edge of the connecting base 232 and the separation shell 210, and the gap 201 allows the liquid to flow through. Through the arrangement of the above-mentioned structure, when in use, the liquid drop flowing down along the surface of the condensation reflux member 230 continues to flow down along the inclined diversion bevel 2323, is in contact with an inner wall of the separation shell 210 when passing through the gap 201, and converges with the liquid on the inner wall of the separation shell 210 to form a greater liquid drop to flow down continuously along the inner wall of the separation shell 210, thus improving the liquid flowing velocity of the product.

In this embodiment, the air filter further includes an air inlet cover 800, the air inlet cover 800 is removably connected with the mounting head 100 and caps the centrifugal air inlet 111. Through the arrangement of the above-mentioned structure, when the product is stored, the air inlet cover 800 can be connected with the mounting head 100, plugged and capped on the centrifugal air inlet 111, to prevent the impurities entering the product along the centrifugal air inlet 111, thus guaranteeing the using safety of the product and prolonging the service life of the product.

In this embodiment, a surface of the spiral regulating shell 550 is also provided with frictional stripes 551. Through the arrangement of the above-mentioned structure, the frictional stripes 551 can increase the frictional coefficient on the surface of the spiral regulating shell 550, so the users are easier and more labor-saving to rotate the spiral regulating shell 550.

In this embodiment, the mounting head 100 is also provided with an airflow guide identification 140, and the airflow guide identification 140 is used for identifying a flowing direction of the airflow. Through the arrangement of the above-mentioned structure, setting the airflow guide identification 140 may enable the users to intuitively understand the flowing direction of the airflow, to accurately connect the air pump with the product, making the air outlet communicate with the centrifugal air inlet 111, preventing the product damage caused by error operations of the users, improving the using experience of the users, guaranteeing the property safety of the users, and prolonging the service life of the product.

As described above, one or more embodiments are provided in conjunction with the detailed description, The specific implementation of the present disclosure is not confirmed to be limited to that the description is similar to or similar to the method, the structure and the like of the present disclosure, or a plurality of technical deductions or substitutions are made on the premise of the conception of the present disclosure to be regarded as the protection of the present disclosure.

The invention claimed is:

1. An air filter, comprising:
   a mounting head, wherein the mounting head is provided with a centrifugal mounting portion and a plurality of filtration mounting portions, the centrifugal mounting portion is provided with a centrifugal air inlet and a centrifugal air outlet, the filtration mounting portions are provided with filtration air inlets and filtration air outlets, and the filtration air outlets communicate with the adjacent filtration air inlets;
   a centrifugal separation assembly, wherein the centrifugal separation assembly is removably connected with the centrifugal mounting portion, and the centrifugal separation assembly is used for separating a solid and liquid in an airflow; and
   a plurality of filtration assemblies, wherein the plurality of filtration assemblies comprise "7"-shaped import pipe fittings, filtration shells and filtration apparatuses, the filtration shells are provided with filtration cavities and openings connected with the filtration cavities, the filtration shells are connected with the filtration mounting portions, the filtration apparatuses are disposed in the filtration cavities, inner walls of the import pipe fittings are defined to form import channels, first ends of the import pipe fittings are connected with the filtration mounting portions, first ends of the import channels communicate with the filtration air inlets, second ends of the import pipe fittings are inserted along the openings and connected with the filtration apparatuses, air guide channels are formed between outer surfaces of the import pipe fittings and inner walls of the openings, and the filtration cavities communicate with the filtration air outlets through the air guide channels wherein the filtration apparatuses are columnar and provided with intermediate channels, and the intermediate channels communicate with second ends of the import channels, allowing the airflow to enter the intermediate channels, pass through the filtration apparatuses and enter the filtration cavities; wherein the filtration apparatuses comprise filter elements, support nets and end connectors, the filter elements are connected with the support nets, the support nets are connected with the end connectors, and the end connectors are connected with the second ends of the import pipe fittings; wherein the centrifugal separation assembly comprises a separation shell and a spiral spoiler, the separation shell is provided with a separation cavity, the separation shell and the spiral spoiler are connected with the centrifugal mounting portion, the spiral spoiler is plugged into the separation cavity, a gap formed between the spiral spoiler and an inner wall of the separation cavity communicates with the centrifugal air inlet, a spiral portion is disposed on a surface of the spiral spoiler, an outer surface of the spiral portion abuts against the inner wall of the separation cavity, a reflux channel is disposed in a middle of the spiral spoiler, and the separation cavity communicates with the centrifugal air outlet through the reflux channel; further comprising a pressure-regulating assembly, wherein the mounting head is provided with a pressure-regulating mounting portion, the pressure-regulating assembly is removably connected with the pressure-regulating mounting portion, and the pressure-regulating mounting portion communicates with the centrifugal air outlet and is used to regulate the air pressure of the airflow flowing out of the centrifugal air outlet; and wherein the centrifugal mounting portion is provided with a first chamber, and also provided with a pressure-regulating air hole that communicates with the first chamber and the centrifugal air outlet, the pressure-regulating assembly comprises a connecting shell and a valve assembly, the connecting shell is provided with a connecting chamber and an air vent communicating with the connecting chamber, the valve assembly is disposed between the first chamber and the connecting chamber, and when the air pressure of the first chamber is greater than the pressure required to open the valve assembly, the valve assembly is opened, allowing the airflow to flow through the connecting chamber from the first chamber and to be discharged along the air vent.

2. The air filter according to claim 1, wherein the plurality of filtration assemblies are successively disposed in parallel, and along a direction away from the centrifugal separation assembly, the filter elements of the filtration assemblies have gradually increased degrees of filtration.

3. The air filter according to claim 1, wherein the centrifugal separation assembly further comprises a condensation reflux member, the condensation reflux member is removably connected with the spiral spoiler and inserted into the reflux channel, and the condensation reflux member is used for condensing liquid drops and allows the liquid drops to flow down along the condensation reflux member.

4. The air filter according to claim 3, wherein the condensation reflux member comprises a tubular condenser pipe and a connecting base, the condenser pipe is provided with a connecting channel, a screw portion of the connecting base passes through the connecting channel and is connected with the spiral spoiler, and an upper end of the condenser pipe abuts against the spiral spoiler while a lower end abuts against an abutment of the connecting base.

5. The air filter according to claim 4, wherein an edge at a bottom of the connecting base is provided with an inclined diversion bevel, a gap exists between the edge of the connecting base and the separation shell, and the gap allows the liquid to flow through.

6. The air filter according to claim 1, further comprising a liquid outlet stopper, wherein a bottom of the separation shell is provided with a liquid outlet that communicates with the separation cavity, and the liquid outlet stopper is removably plugged into the liquid outlet.

7. The air filter according to claim 1, wherein the valve assembly comprises a first elastic member, a diaphragm and a valve rod, the first elastic member is disposed in the connecting chamber, the diaphragm is provided with an air valve hole, the valve rod is disposed in the centrifugal mounting portion, and an elastic force of the first elastic member drives the diaphragm to be downward, such that an upper end of the valve rod is plugged into the air valve hole and abuts against an edge of the air valve hole.

8. The air filter according to claim 7, wherein the pressure-regulating assembly further comprises a spiral regulating shell, a screw member and a nut base, the spiral regulating shell is rotationally connected with the connecting shell, the screw member is connected with the connecting shell, the nut base is in threaded connection with the screw member, the nut base is connected with an upper end of the first elastic member, and a lower end of the first elastic member abuts against an upper surface of the diaphragm.

9. The air filter according to claim 8, wherein a surface of the spiral regulating shell is also provided with frictional stripes.

10. The air filter according to claim 7, wherein the valve assembly further comprises a second elastic member and a valve base, the valve base is connected with a bottom of the valve rod, and one end of the second elastic member abuts against the valve base while the other end abuts against an interior of the mounting head.

11. The air filter according to claim 10, wherein a valve rod channel and a valve rod air hole passing through a side wall of the valve rod channel are disposed in the valve rod, the valve rod channel communicates with the separation cavity, and the valve rod channel communicates with the centrifugal air outlet through the valve rod air hole.

12. The air filter according to claim 1, further comprising a first barometer, wherein the first barometer is connected with the centrifugal mounting portion of the mounting head, the mounting head is provided with a first barometer channel, and the first barometer channel communicates with an air inlet of the first barometer and the centrifugal air outlet.

13. The air filter according to claim 1, further comprising a second barometer, wherein the second barometer is connected with one filtration mounting portion of the mounting head, the mounting head is provided with a second barometer channel, and the second barometer channel communicates with an air inlet of the second barometer and the import channels.

14. The air filter according to claim 1, further comprising an air inlet cover, wherein the air inlet cover is removably connected with the mounting head and caps the centrifugal air inlet.

15. The air filter according to claim 1, wherein the mounting head is also provided with an airflow guide identification, and the airflow guide identification is used for identifying a flowing direction of the airflow.

\* \* \* \* \*